US009000079B2

(12) United States Patent
Hu et al.

(10) Patent No.: US 9,000,079 B2
(45) Date of Patent: Apr. 7, 2015

(54) LOW APPLICATION TEMPEARATURE AMORPHOUS POLY-α-OLEFIN ADHESIVE

(71) Applicant: Henkel Corporation, Rocky Hill, CT (US)

(72) Inventors: Yuhong Hu, Belle Mead, NJ (US); Charles W. Paul, Madison, NJ (US); Darshak Desai, Edison, NJ (US); Salvador Alvarado, Belle Mead, NJ (US)

(73) Assignee: Henkel IP & Holding GmbH, Duesseldorf (DE)

( * ) Notice: Subject to any disclaimer, the term of this patent is extended or adjusted under 35 U.S.C. 154(b) by 135 days.

(21) Appl. No.: 13/771,439

(22) Filed: Feb. 20, 2013

(65) Prior Publication Data

US 2013/0158176 A1 Jun. 20, 2013

Related U.S. Application Data

(63) Continuation of application No. PCT/US2011/048933, filed on Aug. 24, 2011.

(60) Provisional application No. 61/377,433, filed on Aug. 26, 2010.

(51) Int. Cl.
*C09J 5/06* (2006.01)
*C09J 123/10* (2006.01)
*C09J 123/14* (2006.01)
*C09J 123/20* (2006.01)
*C09J 123/18* (2006.01)

(52) U.S. Cl.
CPC ............. *C09J 123/20* (2013.01); *C09J 123/14* (2013.01); *C09J 5/06* (2013.01); *C09J 123/10* (2013.01); *C09J 123/18* (2013.01); *C09J 2201/61* (2013.01); *C09J 2400/263* (2013.01)

(58) Field of Classification Search
CPC .......... C09J 5/06; C09J 123/14; C09J 123/20; C09J 123/18; C09J 2201/61; C09J 2400/263; C09J 123/10

USPC ......................................................... 524/270
See application file for complete search history.

(56) References Cited

U.S. PATENT DOCUMENTS

| 4,264,756 | A | 4/1981 | Trotter et al. |
|---|---|---|---|
| 4,749,739 | A | 6/1988 | Foster et al. |
| 5,644,431 | A | 7/1997 | Magee |
| 5,908,505 | A | 6/1999 | Bargenquest et al. |
| 6,628,460 | B1 | 9/2003 | Ookawa et al. |
| 7,130,126 | B1 | 10/2006 | Chung |
| 7,348,376 | B2 * | 3/2008 | Gelles ........................ 524/505 |
| 7,514,140 | B2 | 4/2009 | Tsukuda |
| 7,639,426 | B2 | 12/2009 | Blondal et al. |
| 2005/0228114 | A1 | 10/2005 | Gelles |
| 2006/0089617 | A1 | 4/2006 | Bunnelle |
| 2006/0285215 | A1 | 12/2006 | Wu |
| 2008/0264562 | A1 * | 10/2008 | Merrill et al. ................ 156/334 |
| 2008/0302262 | A1 | 12/2008 | Pinto et al. |
| 2009/0075540 | A1 | 3/2009 | Zhou et al. |

FOREIGN PATENT DOCUMENTS

| CN | 1891748 A | 1/2007 |
|---|---|---|
| JP | 08003527 A | 1/1996 |
| JP | 08325539 A | 12/1996 |
| JP | 2009057397 A | 3/2009 |
| WO | 2005108442 A1 | 11/2005 |

OTHER PUBLICATIONS

Rextac 2730 Technical Data Sheet, no date.*
Olabisi, Olagoke. Handbook of Thermoplastics. Plastics Engineering, Marcel Dekker, Inc., vol. 41, Mar. 19, 1997, pp. 16-17, 23-25, 27.

* cited by examiner

*Primary Examiner* — Angela C Scott
(74) *Attorney, Agent, or Firm* — Sun Hee Lehmann

(57) ABSTRACT

It has been discovered that amorphous polybutene copolymers that have a softening point of from about 70 to about 105° C. and viscosity of less than about 1,900 cP at 190° C. possesses desirable properties and may be used to make a low application temperature hot melt adhesive for disposable absorbent articles.

13 Claims, No Drawings

LOW APPLICATION TEMPEARATURE AMORPHOUS POLY-α-OLEFIN ADHESIVE

FIELD OF THE INVENTION

The invention relates to a low application temperature amorphous poly-α-olefin adhesive used on nonwoven articles. The adhesive is particularly useful in the construction of nonwoven articles, e.g., disposable absorbent articles such as diapers, feminine hygiene articles, adult incontinence devices, underpads, bed pads, industrial pads and the like.

BACKGROUND OF THE INVENTION

Hot melt adhesives are applied to a substrate while in a molten state and cooled to harden the adhesive layer. Such adhesives are widely used for various commercial and industrial applications such as product assembly and packaging, and have been widely used in the nonwoven industry to make nonwoven articles. In these applications, adhesive is applied to at least one substrate for binding the substrate to a second similar or different substrate.

In a hot melt adhesive, base polymer provides cohesive strength and elasticity. The use of high molecular weight polymer or high polymer content usually promotes cohesive strength and adhesion; however, it also results in significant melt viscosity increase. A hot melt adhesive with high viscosity may require very high processing temperature, at which polymers are susceptible to degradation, charring, gelling and loss of adhesion. Moreover, high processing temperature increases energy cost, creates a safety hazard and deforms/discolors polymeric substrate film.

Conventional low application temperature hot melt adhesives, e.g. styrene-butadiene-styrene, styrene-isoprene-styrene and metallocene polyolefin based adhesives, are known, however, amorphous poly-α-olefin based adhesives are not processed at low temperature unless large quantities of low molecular weight diluents are added to lower the adhesive viscosity. Adding high levels of diluents, such as tackifiers and waxes, decreases mechanical strength of the adhesive, and more importantly, causes less resistance to flow at body temperature. Also, over time, the low molecular weight diluents in the adhesive tend to migrate and separate out from the adhesive further affecting the strength and appearance of the adhesive.

There is a need for a hot melt adhesive that can be applied at low temperature, i.e., below about 150° C., which has lower amount of diluents, without sacrificing the mechanical strength and appearance of the adhesive. Such attributes would make the adhesives particularly well-suited for use in the manufacture of absorbent disposable articles. The current invention addresses this need.

BRIEF SUMMARY OF THE INVENTION

It has been discovered that amorphous poly-α-olefin copolymer that has a softening point of from about 70 to about 105° C. and viscosity of less than about 1,900 cP at 190° C. can be used in the manufacture of low application temperature hot melt adhesives. Such adhesives find utility as construction adhesives, and are particularly well suited for the manufacture of disposable absorbent articles such as sanitary napkins, incontinent pads, bed pads, feminine pads, panty shields, diaper inserts, and the like.

In one embodiment, the invention provides a low application temperature hot melt adhesive comprising at least 45%, based on the total adhesive, of an amorphous polybutene copolymer that has a ring-and-ball softening point of about 70 to about 105° C. and viscosity of less than about 1,900 cP at 190° C. The hot melt adhesive prepared with the same amorphous polybutene copolymer has a viscosity less than about 6,000 cP at 150° C.

Another embodiment is directed to a low application temperature hot melt adhesive with an amorphous polybutene copolymer that has a tan(δ) value greater than 30 at 140° C.

In a further embodiment, the amorphous polybutene copolymer of the low application temperature hot melt adhesive is copolymerized with ethylene, propylene, hexene and/or octene comonomers.

In another embodiment, the low application temperature hot melt adhesive further comprises a tackifier which has a softening point greater than or equal to 80° C.

Yet another embodiment provides an article manufactured with the inventive low application temperature adhesive. The articles include disposable absorbent articles such as sanitary napkins, incontinent pads, bed pads, feminine pads, panty shields, diaper inserts, meat pads and the like.

Another embodiment is directed to a method of applying the inventive low application temperature adhesive at 150° C. or below to a first substrate, applying a second substrate onto the adhesive, thereby forming a bond.

DETAILED DESCRIPTION OF THE INVENTION

The present invention is directed to adhesive compositions comprising amorphous poly-α-olefin copolymer, which adhesive compositions have better performance characteristics and/or cost less than conventional hot-melt adhesives. It has been discovered that amorphous polybutene copolymers that have a softening point of from about 70 to about 105° C. and viscosity of less than about 1,900 cP at 190° C. possess desirable properties and may be used to make a low application temperature hot melt adhesive for disposable absorbent articles.

For the purpose of this disclosure, the term "poly-α-olefin" means an atactic poly-α-olefin copolymer that is amorphous with minor crystallinity.

The amorphous polybutene copolymer has a Ring and Ball softening point (as measured in accordance with ASTM E28) of from about 70 to about 105° C. The Ring and Ball softening point is related to the butene content of the copolymer. By varying the levels of butene in the copolymer, the desired softening point of the copolymer can be selected. The preferred polybutene is a high 1-butene atactic poly-α-olefin. The term "high butene poly-α-olefin" typically indicates that greater than 40 wt %, preferably greater than about 50 wt %, of the polymer comprises a 1-butene monomer. The other monomers that are copolymerized with butene are ethylene, propylene, hexene, octene and mixtures thereof. Typically, about 40 to about 70% of 1-butene with about 30 to about 60% of propylene and minor amounts of other monomers are present in the amorphous polybutene copolymer.

The amorphous polybutene copolymer has a viscosity less than about 1,900 cP at 190° C., as determined by Brookfield viscometer according to the ASTM D3236 test method. The viscosity of the amorphous polybutene copolymer is dependent upon the molecular weight of the copolymer. As the molecular weight of the copolymer increases, the viscosity increases.

The copolymer's tan δ value is also an important factor in selecting the polymer for the low application temperature hot melt adhesive. Tan δ of a polymer is the ratio of the loss modulus (G") to the storage modulus (G'): (G"/G'). This is a dimensionless quantity that is proportional to the ratio of the energy lost to energy stored. It has been discovered that copolymers with a tan δ value greater than 30, preferably greater than 40, more preferably greater than 50, at 140° C. can advantageously be used as a low application hot melt adhesive because they can flow and be sprayed using a conventional applicator at or below 150° C. Adhesives prepared with copolymers with tan δ value less than 30 at 140° C. cannot be sprayed at or below 150° C., and must be sprayed at higher temperature.

The polymer provides the important adhesive properties such as open time, shear strength, tensile strength, cohesiveness and viscosity. The adhesive can comprise, in its entirety, one of a number of useful polymers, a blend of polymers, or alternatively the adhesive can comprise a hot melt adhesive comprising at least one polymer admixed with other components. The polymer may be combined with a tackifier or additives to modify the adhesive properties.

In another embodiment, the low application hot melt adhesive comprises additional components. The components include a tackifier to provide strength, waxes or plasticizers/oil to modify viscosity, and/or other additives including antioxidants or other stabilizers.

Suitable tackifiers have a softening point greater than or equal to 80° C. Examples of suitable tackifiers are listed in Paul C. W. (2002) *Hot Melt Adhesives, Chaudhury M and Pocius A V (ed) Surfaces, Chemistry and Applications: Adhesion Science and Engineering*, Elsevier Science B. V, The Netherlands pp 711-757, which include fully or substantially saturated (e.g. hydrogenated) C5 resins, derived from piperylene or di-cyclopentadiene (DCPD). Other suitable tackifiers include hydrocarbons derived from petroleum distillates, rosin, rosin esters, hydrogenated rosin esters, polyterpenes derived from wood, polyterpenes derived from synthetic chemicals, as well as combinations of any of these. A commercially available example of a suitable tackifier is ESCOREZ® 5340 tackifier, available from Exxon-Mobil. ESCOREZ® 5340 has a softening point of 140° C. and viscosity of 5000 cps at 177° C. Another suitable tackifier, ESCOREZ® 5320, has a softening point of 122° C., and a relatively low viscosity of 1,500 cP at 177° C. Yet another suitable tackifier, ESCOREZ® 5415, has a softening point of 118° C., and a lower viscosity of 900 cps at 177° C. The amount of tackifier in the adhesive composition ranges from 0 to about 55 wt %, based on the total weight of the adhesive.

Additionally, the adhesive composition may include an antioxidant stabilizer, suitably in an amount sufficient for maintaining the desired properties of adhesives. Sufficient amounts of antioxidant stabilizer would be apparent to one skilled in the art. For example, the adhesive composition may include an antioxidant stabilizer in an amount of about 1% or less by weight of the adhesive composition. One example of a suitable antioxidant is available from Ciba Specialty Chemicals under the trade designation IRGANOX 1010.

Also, optionally, wax may be present in the adhesive. Suitable wax includes paraffin waxes, microcrystalline waxes, polyethylene waxes, polypropylene waxes, by-product polyethylene waxes, Fischer-Tropsch waxes, oxidized Fischer-Tropsch waxes and functionalized waxes such as hydroxy stearamide waxes and fatty amide waxes. It is common in the art to use the terminology, synthetic high melting point waxes, to include high density low molecular weight polyethylene waxes, by-product polyethylene waxes and Fischer-Tropsch waxes. Modified waxes, including vinyl acetate modified waxes such as AC-400 (Honeywell) and MC-400 (available from Marcus Oil Company), maleic anhydride modified waxes such as Epolene C-18 (available from Eastman Chemical) and AC-575A and AC-575P (available from Honeywell) and oxidized waxes may be used in the practice of the invention. If used, the wax is generally present in an amount of up to about 15 wt %, based on the total weight of the adhesive.

Additional additives include a plasticizer/oil, color pigment or dye, fragrance, filler, a polymer compatibilizer, and/or a low softening point additive. Examples of suitable plasticizer/oil include benzoates, phthalates, paraffin oils, mineral oils, polyisobutylene, chlorinated paraffins, and the like. Examples of suitable color pigments and fillers include $TiO_2$, carbon black, and calcium carbonate. Examples of suitable polymer compatibilizers include polypropylene-b-polyethylene, polypropylene-b-polybutene diblock copolymers.

Hot-melt processable means that an adhesive composition may be liquefied under heat, from about 38-235° C. Generally, at the point of application, the substantially liquefied adhesive composition will pass through a nozzle or bank of nozzles, but may pass through some other mechanical element such as a slot. The hot melt adhesive prepared with amorphous polybutene copolymer that has a Ring-and-Ball softening point of about 70 to about 105° C. and viscosity of less than about 1,900 cP at 190° C. is processable at temperature of at 150° C. or less. The hot melt adhesive prepared with the amorphous polybutene copolymer has a viscosity less than about 6,000 cP at 150° C. and can be sprayed using conventional nozzles to provide desired pattern and add-on levels of adhesive on a moving web. Suitable nozzles are commercially available from Nordson Corporation and Illinois Tool Works Inc.

It has been discovered that amorphous polybutene copolymer based adhesives with a tan δ value greater than 30 at 140° C. can advantageously be sprayed at temperatures of at or less than 150° C. Preferably, amorphous polybutene copolymer based adhesives with a tan δ value greater than 40 at 140° C., more preferably greater than 50 at 140° C., can be sprayed at temperatures of at or less than 150° C.

The adhesive composition is processed by heating and blending the amorphous polybutene copolymer, and optionally with additional components. This can be heated or heated/blended using an extruder or hot-melt processing equipment. For the heating and blending method, various methods are contemplated: (1) amorphous polybutene copolymer could be heated and the optional components could be added subsequent to heating the copolymer, (2) optional components could be heated and the copolymer is added subsequent to heating the optional components or (3) both amorphous polybutene copolymer and the optional components could be combined prior to heating. This resultant adhesive can be used directly to bond articles or it can be cooled and processed to make a solid form (e.g., palletized, pillowed, or cast into molds or drums, etc), which can be stored and/or shipped. The blend, in solid form, would be heated to substantially liquefy the tackified adhesive composition prior to its being used to make a bonded article.

One method of making a bonded article includes the steps of heating the amorphous polybutene copolymer adhesive to a temperature of about 150° C., applying the adhesive on a first substrate, joining a second substrate so that some or all of the applied adhesive composition is positioned between the first substrate and second substrate, and cooling the adhesive to form a bond.

Typical substrates are nonwoven film materials that typically have a basis weight in the range of about 10 to 25 gsm (g/m²) based on fibers of polyethylene, polypropylene, polyester or cellulose. Also typical substrates are flexible sheet-like film such as polyethylene or polypropylene films. The adhesive according to the invention may be used to bond the same or different substrate materials to one another.

The bonded article has a dynamic peel strength of at least 50 grams per inch, even at low add-on levels. The adhesive of the invention exhibits a peel strength far greater than conventional hot melt adhesive, e.g., based on metallocene polyolefins and rubber based adhesives. Due to the high peel strength of the inventive adhesive, lower amounts of adhesive coatings weights, e.g. less than or equal to 20 gsm or less than or equal to 10 gsm, preferably less than or equal to 5 gsm, more preferably less than or equal to 3 gsm, can be used to achieve sufficient bond strength to the substrate. Moreover, the adhesive prepared with the amorphous polybutene copolymer is less expensive than conventional adhesive that requires large quantities of tackifiers, which are often more expensive than polymers.

The amorphous poly-α-olefin copolymer based adhesive is sprayable at or below 150° C. Because the adhesive of the invention can be applied at lower temperatures with low add-on levels, there is a reduced likelihood of deformation and discoloration of polymeric substrate film.

The bonded articles of the invention are suitable for use in absorbent articles such as diapers, diaper pants, baby wipes, training pants, absorbent underpants, child care pants, swimwear, and other disposable garments; feminine care products including sanitary napkins, wipes, menstrual pads, panty liners, panty shields, tampons, and tampon applicators; adult-care products including wipes, pads, containers, incontinence products, and urinary shields; clothing components; athletic and recreation products; products for applying hot or cold therapy, medical gowns (i.e., protective and/or surgical gowns), surgical drapes, caps, gloves, face masks, bandages, wound dressings, wipes, covers, containers, filters, disposable garments and bed pads, medical absorbent garments, underpads; construction and packaging supplies, industrial pads including meat pads; products for cleaning and disinfecting, wipes, covers, filters, towels, bath tissue, facial tissue, nonwoven roll goods, home-comfort products including pillows, pads, cushions, masks and body care products such as products used to cleanse or treat the skin, laboratory coats, cover-alls, and the like.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled

EXAMPLES

Viscosities were determined using a Brookfield viscometer with a Thermosel heating unit and spindle 27 at 190° C. or 150° C.

Ring and ball softening point is the reported values in accordance with ASTM E 28.

Storage modulus and loss moduli were measured and the Tan δ value was calculated by ARES M Rheometer from Rheometric Scientific using the Temperature Ramp Method (ARES LS). A sample was placed in parallel plates (25 mm geometry diameter) with a 2 mm gap. Dynamic temperature sweep from 150° C. to 0° C. was tested with a frequency of 10 rad/sec and cooling rate of 5° C./minute. The storage modulus (G') and the loss modulus (G") were calculated from the torque and strain data. Their ratio (G"/G'), also known as the tan (δ), was calculated.

Dumbbell shaped sample was prepared in a mold for the tensile peak test. The test sample was shaped with two 1"×1" ends connected by a ½×½" connector (the total length was 2½"), and the thickness of the sample was ⅛". The sample was then conditioned at 23° C. and 50% relative humidity for at least 72 hours and tested on a Sintech 1/D mechanical tester at 23° C. and 50% relative humidity. The sample was gripped at the dumbbell ends (1"×1" area) and pulled at a crosshead speed of 12"/min until the sample tore or broke. This test was repeated three to four times, and the average tensile peak value was calculated and reported.

Peel strength was measured by Sintech 1/D mechanical tester at 23° C./50% relative humidity. Coated laminate sample was prepared by applying the adhesive in between a nonwoven film and a Pliant poly film (Pliant Corporation) and left at room temperature for at least 72 hours. A three inches wide laminated sample was tested for peak peel strength. Each film end was pulled apart from each other, in T-shape, at a rate of 12 inches/min at an angle of 180°, and the resultant peel strength was reported in g/in.

Table 1 lists various amorphous polybutene copolymers and their respective viscosity, softening point and tan δ values. Copolymers of this class can be purchased through Rextac, Evonik or Eastman, or can be formed by known processes in the art.

TABLE 1

Amorphous butene-propylene copolymer examples

| Polymer | Viscosity @ 190° C. | R&B S.P. (° C.) | Tan δ at 140° C. |
|---|---|---|---|
| Copolymer 1 | 840 cps | 88.4 | 59.0 |
| Copolymer 2 | 1550 cps | 90.8 | 53.0 |
| Copolymer A | 3375 cps | 91.5 | 17.0 |
| Copolymer B | 3560 cps | 105.2 | 22.8 |
| Copolymer C | 3100 cps | 103.0 | 15.4 |
| Copolymer D | 1560 cps | 145.0 | 10.5 |
| Copolymer E | 3025 cps | 108.0 | 21.0 |
| Copolymer F | 2200 cps | 111.5 | 31.3 |
| Copolymer G | 8100 cps | 118.0 | 8.5 |

Useful copolymer for the invention has a viscosity less than 1,900 cP measured at 190° C., Ring and Ball softening point ranges of 70-105° C., and tan δ value greater than 30 at 140° C. Only Copolymers 1 and 2 meet all three criteria, and comparative Copolymers A-G have at least one criteria outside of the useful ranges.

Table 2 lists adhesive samples made with Copolymer 2 with various types and amounts of tackifiers. The adhesive and resin/tackifier, listed in Table 2, were melted together with heat (at or greater than 140° C.) until a homogenous melt was formed. The resultant adhesive characteristics of the samples were tested and the results are listed in Table 2.

TABLE 2

Adhesive composition

| Components | Sample 1 | Sample 2 | Sample 3 | Sample 4 |
|---|---|---|---|---|
| Copolymer 2 | 40 | 45 | 70 | 80 |
| Resin/tackifier - Escorez 5380 | 59.5 | 54.5 | 29.5 | |
| Resin/tackifier - Eastotac H130 | | | | 19.5 |
| Anti-oxidant - Irganox 1010 | 0.5 | 0.5 | 0.5 | 0.5 |
| Adhesive characteristics | | | | |
| Viscosity @150° C. (cP) | 1290 | 1465 | 2700 | 4150 |

TABLE 2-continued

| | Adhesive composition | | | |
|---|---|---|---|---|
| Components | Sample 1 | Sample 2 | Sample 3 | Sample 4 |
| Tan δ at 140° C. | 61 | 67 | 75 | 58 |
| R&B S.P. (° C.) | 66.4 | 69.3 | 84.6 | 91.6 |
| Tg (° C.) | 22.8 | 18.4 | −5.0 | −7.1 |

All of the above adhesive samples have viscosity less than 6,000 cP at 150° C. The adhesive formulations comprise a wide range of copolymer and resin amounts as demonstrated above, and may also comprise prominently of copolymer.

Several adhesive samples were prepared with different base polymer and tested against the inventive adhesive for their performance properties in Table 3. The base polymer type and content is noted in Table 3. Each sample was mixed with a tackifier under heat (greater than 140° C.) until a homogenous melt was formed. Adhesive characteristics were measured and reported in Table 3. Each adhesive was then applied in between a nonwoven and a poly film substrate with a specified add-on level and the resultant peel strength are shown in Table 3.

TABLE 3

Construction Adhesives with Various Base Polymer

| Base polymer | Sample 4 Amorphous butene-copolymer (Copolymer 2) (80 wt %) | Sample X Styrene-Butadiene-Styrene (19.5 wt %) | Sample Y Metallocene polyolefin (16 wt %) | Sample Z Amorphous butene-copolymer (Copolymer E) (80 wt %) |
|---|---|---|---|---|
| Adhesive characteristics | | | | |
| Viscosity @ 150° C. | 4150 | 2400 | 5375 | 7800 |
| R&B S.P. (° C.) | 91.6 | 73 | 82 | 110 |
| Tan δ at 140° C. | 57 | 128 | 37.3 | 23.8 |
| Tensile Peak (psi) | 103 | 80 | 22 | 55 |
| Peel strength was measured after attaching substrates together with the specific Sample adhesive (general purpose 13.5 gsm spunbond nonwoven and 0.5 mil Pliant poly film, Pliant Corporation) | | | | |
| Spiral pattern[a] application Temp (° F./° C.) | 260/127 | 280/138 | 290/143 | 325/163 |
| Peel strength (g/in) (Spiral @ 3 gsm on GP substrates) | 600 | 470 | 405 | 460 |
| Random pattern[b] application Temp (° F./° C.) | 300/149 | 300/149 | 320/160 | 350/177 |
| Peel strength (g/in) (Signature @ 1.5 gsm on GP substrates) | 318 | 149 | 153 | 120 |

[a]Nordson ® Spiral nozzle head which sprays spiral patterns of hot melt adhesive
[b]Nordson ® Signature spray nozzle which sprays random patterns with dense, uniform coverage of hot melt adhesive For Comparative Samples X and Y of Table 3, less than 20 wt % of the total composition is made up of the base polymer.

While Comparative Sample Z (prepared with Copolymer E) also utilizes 80 wt % of amorphous butene copolymer, this application temperature is higher than the application temperature of Sample 4 (prepared with Copolymer 2). Moreover, the use of the base Copolymer 2 in Sample 4 adhesive resulted in the highest peel strength.

We claim:

1. A hot melt adhesive comprising at least 45 wt %, based on the adhesive, of an amorphous polybutene copolymer having (a) greater than about 50 wt % of 1-butene monomer, (b) a softening point of from about 70 to about 105° C. and (c) a viscosity of less than about 1,900 cP at 190° C., and (d) a tan δ value greater than 30 at 140° C.

wherein the hot melt adhesive has a viscosity of less than about 6,000 cP at 150° C.

2. The hot melt adhesive of claim 1 wherein the amorphous polybutene copolymer further comprises propylene comonomer.

3. The hot melt adhesive of claim 1 further comprising a tackifier which has a softening point greater than or equal to 80° C.

4. The hot melt adhesive of claim 3 wherein the tackifier has a softening point greater than or equal to 100° C.

5. The hot melt adhesive of claim 3 wherein the tackifier is selected from the group consisting of C5 resins, petroleum distillates, hydrogenated hydrocarbons, C5/C9, polyterpenes, rosin, hydrogenated rosin, and rosin esters and mixtures thereof.

6. The hot melt adhesive of claim 1 further comprising a crystalline wax which has a melting point greater than 60° C.

7. The hot melt adhesive of claim 6 wherein the crystalline wax is selected from the group consisting of Fischer-Tropsch wax, petroleum based wax, conventional wax, natural-based wax, functionalized wax, polyolefin copolymers and mixtures thereof.

8. The hot melt adhesive of claim 1 which is essentially free of wax and/or plasticizer.

9. The hot melt adhesive of claim 1 which comprises greater than 60% of the 1-butene monomer.

10. The hot melt adhesive of claim 1 wherein the adhesive has a tensile peak value greater than 55 psi at 23° C. at a pulling rate of 12 in/min.

11. An article comprising the adhesive of claim 1.

12. The article of claim 11 which is a personal care, health, medical, household or industrial product.

13. The article of claim 12 which is a diaper, training pants, feminine hygiene pad, meat pads and adult incontinence products.

* * * * *